United States Patent [19]

Halvorsen

[11] Patent Number: 4,539,194

[45] Date of Patent: Sep. 3, 1985

[54] METHOD FOR PRODUCTION OF PURE SILICON

[75] Inventor: Gunnar Halvorsen, Vågsbygd, Norway

[73] Assignee: Elkem a/s, Oslo, Norway

[21] Appl. No.: 577,048

[22] Filed: Feb. 6, 1984

[30] Foreign Application Priority Data

Feb. 7, 1983 [NO] Norway ................. 830391

[51] Int. Cl.$^3$ ............................................. C01B 33/02
[52] U.S. Cl. ............................................. 423/348
[58] Field of Search ......................................... 423/348

[56] References Cited

U.S. PATENT DOCUMENTS

| | | | |
|---|---|---|---|
| 2,885,364 | 5/1959 | Swartz | 423/348 |
| 3,809,548 | 5/1974 | Aas et al. | 423/348 |
| 4,241,037 | 12/1980 | Pelosini et al. | 423/348 |
| 4,379,777 | 4/1983 | Boulos | 423/348 |

FOREIGN PATENT DOCUMENTS

| | | | |
|---|---|---|---|
| 2729464 | 1/1979 | Fed. Rep. of Germany | 423/348 |
| 852710 | 10/1960 | United Kingdom | 423/348 |

*Primary Examiner*—William R. Dixon, Jr.
*Assistant Examiner*—Steven Capella
*Attorney, Agent, or Firm*—Lucas & Just

[57] ABSTRACT

Pure silicon metal is produced from a silicon metal which contains 1–10% Ca and which is cast into molds with relatively slow rate of cooling. The cast metal is pre-crushed and thereupon subjected to a purification process consisting of two leaching steps where in the first leaching step there is employed an aqueous solution of $FeCl_3$ or $FeCl_3+HCl$ which causes a disintegration of the metal. The fines are washed away in place thereof, and the metal is further leached in the second leaching step with an aqueous $HF+HNO_3$ solution. The necessary amount of calcium is supplied in the smelting furnace in the form of CaO or other suitable Ca compound.

5 Claims, No Drawings

METHOD FOR PRODUCTION OF PURE SILICON

The invention relates to a method for production of silicon of so high purity that it can be utilized in solar cells.

Usual metallurgical grade silicon contains several metallic and non-metallic impurities which make it unsuited for use in solar cells. The non-metallic impurities as boron and phosphorus can be reduced chiefly by choice of suitable raw materials for production of silicon metal, but this is only possible to a certain degree as regards the most important metallic impurities Fe, Al, Mn, Cu, Ni and others. Raw materials of high purity are however very expensive and it is therefore desirable to procure a simple and cheap purification process by which the metallic impurities can be removed and/or reduced to such a low degree that the purified silicon is suitable for production of solar cells.

It is known that the metallic impurities are rejected by the silicon metal during the crystallization, and that they will crystallize along the grain borders of the silicon, either as intermetallic compounds or as silicides. The purification of silicon can therefore be effected by governing the crystallization so that the impurities can be collected and removed, for instance by means of crystal drawing, zone smelting or similar methods, or by dissolving the impurities by means of an acid which does not attack the silicon metal.

Crystal drawing as well as zone smelting are very effective purification methods, but are extremely expensive and require at least double purification of the metallurgical grade silicon before satisfactory solar cell quality is obtained.

By dissolving the impurities by means of alloying of Al and Ca to the silicon metal with subsequent treatment with acid $FeCl_3$ solution there is obtained an alloy which initially contains 95-97% Si and 3-5% Fe and is purified into a silicon metal with a total degree of impurities of 0.2-1.0%. This is however not sufficient for solar cell quality silicon.

The inventor has now found a method for purification of metallurgical grade silicon by which is obtained silicon of solar cell quality. By the method of the invention the starting material is metallurgical grade silicon metal which is produced from usual raw materials without any special requirements to high degree of purity, and the charge is supplied with Ca-containing compounds as for instance lime or similar material in such quanities that the metal which is tapped from the furnace contains 1-10% Ca. The effect of the purification rises with increasing addition of Ca, but simultaneously the loss of Si will also increase. The best technical-/economical results seem to be obtained by addition of about 3% Ca.

The Ca-containing silicon metal can also for instance be produced by smelting usual metallurgical grade silicon in an induction furnace in which the temperature is maintained above the smelting point for a certain period, for instance ½-1 hour, whereupon calcium is supplied in the form of burned lime for formation of $CaO$-$SiO_2$ slag. The lime can either be stirred into the metal or injected in known way. The produced metal is in both cases cast in graphite moulds or other molds in which the cooling rate is relatively slow. After finished cooling the metal is pre-crushed.

The purification of the metal takes place in a two step leaching process where in the first leaching step there is employed an aqueous solution of $FeCl_3+HCl$ which effects a rapid cracking (disintegration) of the metal into fine silicon metal grains.

In the second leaching step there is used an aqueous $HF+HNO_3$ solution. Fines are washed away after each leaching step and the product is at last washed in distilled water.

If the metallurgical grade silicon should have a comparatively high content of aluminium aluminum the slagged treatment can with advantage be carried out before the addition of lime. Quartz and burned lime respectively calcium carbonate is then used as slagging additives in a weight ratio of about 1:1. A slag consisting of $CaF_2$, $SiO_2$ and $CaO$ can also be used. The slag quantity should constitute 10-50% of the quantity of silicon metal, depending on the aluminum content of the melt. By such slag treatment the content of aluminium in the melt should be lowered to 0.1% by weight or lower. When the slag treatment is carried out in an induction furnace the inductive stirring can be utilized and the retention time thus reduced.

After the slag treatment in the induction furnace calcium is added in the form of burned lime, calcium carbonide, calsium metal or other calcium carrier, either in a batch by stirring or injection in known way. The contents of calcium in the metal after alloying should be at least 1%. The quantity is however depending on the level of the impurities in that metal which is to be purified. When using metallurgical grade silicon produced from unselected raw materials 5-10% calcium will be necessary to obtain a degree of impurities in the product which can be accepted. The loss of calcium by such treatment is however high and it is therefore necessary to use a big excess in relation to the theoretical amount of calcium in order to obtain the required alloy. The loss depends on temperature, method of treatment, alloying rate and in which form the calsium is added. It can be necessary to use 5-10 times the theoretical amount of calcium. After alloying of calcium the metal should be cast as soon as possible so that reoxidation of calcium is avoided. in the course of few minutes.

The casting should as mentioned take place in graphite molds or in other molds in which the rate of cooling is relatively slow. The casting should also take place through quartz- or SiC-filter bed in order to retain slag and coarse foreign particles. By utilization of molds which give a relatively slow rate of cooling which is neither too high nor too low there is obtained a grain structure which results in small amounts of fines (0.0050 m.m) and coarse particles (1.0 m.m). Fines will result in loss in the leaching process and coarse particles can contain inclusions of intermetallic phases and foreign particles which will impure the product. A predominent growth direction of the crystals will have a positive effect on the purity. The size of the crystals can as known be affected by changing the rate of cooling by the casting.

The cast metal should be pre-crushed before the leaching in the first step. The grain size is not of decisive importance for the process, but the crushing should of course be carried out without too high losses of fines and to a size which secures simple treatment of the crushed material.

The purification takes place as mentioned in a two step leaching process and can be carried out as well in batch process as in a continous process. In the first step the pre-crushed material is leached with a solution consisting of FeCl$_3$ or FeCl$_3$+HCL at about 100° C. This leaching results in a rapid cracking of the metal grains along the grain borders. The amount of liquid should be at least in the weight ratio of one part liquid to one part metal, but it can in some cases be of advantage to use higher amounts of liquid as for instance 5 to 1 in order to obtain better separation. The reaction with FeCl$_3$ is much quicker than with HCl, and the concentration of FeCl$_3$ should be at least 50 gr Fe+/liter. It has been obtained better results with a mixture containing about 40 g free HCl/liter. By employment of hydrochloric acid only this can be obtained or obtained by diluted hydrochloric acid as in concentrated aqueous solutions. The dominating impurity in the pre-crushed metal is CaSi$_2$ which is dissolved in the first leaching step by reaction with the strongly acid solutions of FeCl$_3$ under formation of H$_2$-gass. Calcium is dissolved as Ca2+. It is not developed any silane gas and the danger for self ignition is therefore very small. The silicon will after this treatment in the first leaching step still contain impurities as Fe, Al and Ca compounds. A part of these impurities are removed by washing with water.

After the washing the metal is supplied to the second leaching step in which it is brought to reaction with hydro-fluoric acid and nitric acid in aqueous solution, for instance in the ratio 2-5% HF and 5-10% HNO$_3$. Too strong concentration will have as a result that too big amounts of silicon metal are dissolved together with the impurities. The HF+HNO$_3$ soulution attacks the grain borders in the silicon metal, and opens for possible inclusions. Phases as Fe$_2$Si$_5$ and other metallic phases can be present in very small crystal sizes and will therefore for an important part be dissolved during the leaching. The reactions are heat delivering, and heat supply is therefore not necessary in this leaching step. By the reaction NO$_2$ and H$_2$ will be liberated and it will also be produced silanes so that there is a risk of self ignition. Good suction must therefore be provided in this step and the leaching liquid should be supplied batchwise. Too big amounts of acid will also here result in dissolution and loss of silicon metal.

The purified metal which is produced by the second leaching step is washed and the washing water can with advantage be supplied a smaller amount of HCl and heated. The product is screened on 1.0 m.m and must subsequently be thoroughly washed in distilled or ion exchanged water. The washing steps before screening should be so adjusted that fines of smaller particle size than 0.050 m.m are washed away.

The results which have been obtained by the purification method according to the invention are compiled in the below table. As starting material was here used metallurgical grade silicon containing 0.7% Fe, 0.3% Al, 0.2% Ca.

| Ca in % | impurities after leaching, washing and screening | | |
|---|---|---|---|
| | % Fe | % Al | Ti, Mn, Cu, Ni, Cr, V, Mo, Zr |
| 1.8 | 0.0026 | 0.0022 | 0.0005 |
| 8.0 | 0.0005 | 0.0010 | 0.0005 |

Simultaneously there was obtained a reduction of the phosphorus contents of up to 90%. The invention is above described in connection with addition of calcium. This can however possibly be substituted by corresponding barium compounds. It is however an important advantage to use calcium in the form of lime which is a cheap raw material.

Strontium has the same effect as calcium, but is of course a much more expensive alloying metal.

I claim:

1. A process for purifying metallurgical grade silicon which comprises the steps of adding one or more calcium compounds to molten metallurgical grade silicon in an amount sufficient to provide molten silicon containing about 1.0 to about 10.0% by weight of calcium, casting the molten silicon into molds and cooling the molten silicon at a sufficiently slow rate to obtain solid silicon having a grain size not over about 1.0 mm, pre-crushing the resulting silicon and leaching it in a first step with an aqueous solution of FeCl$_3$ or an aqueous solution containing FeCl$_3$ and HCL which cause disintegration of silicon, washing away fines from the leached silicon and in a second step leaching the silicon with an aqueous solution containing HF and HNO$_3$.

2. The process of claim 1 in which the metallurgical grade silicon is produced in a smelting furnace and the one or more calcium compounds are selected from the group consisting of CaO and CaCO$_3$ which are added directly to the molten silicon in the smelting furnace.

3. The process of claim 1 in which the calcium compound is lime which is injected or stirred into the molten silicon.

4. The process of claim 1 which includes the step of using distilled water to wash away the fines.

5. The process of claim 1 which includes the step of substituting strontium in whole or in part for the calcium compounds set forth in claim 1.

* * * * *